United States Patent
Lacroix et al.

(10) Patent No.: US 9,615,002 B2
(45) Date of Patent: *Apr. 4, 2017

(54) SYNCHRONIZATION OF HAPTIC EFFECT DATA IN A MEDIA TRANSPORT STREAM

(71) Applicant: IMMERSION CORPORATION, San Jose, CA (US)

(72) Inventors: Robert A. Lacroix, San Jose, CA (US); Andrianaivo Rabemiarisoa, Lasalle (CA); Henrique D. Da Costa, Montreal (CA); Herve Thu Timone, Montreal (CA); Stephen D. Rank, San Jose, CA (US); Christopher J. Ullrich, Ventura, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/252,391

(22) Filed: Apr. 14, 2014

(65) Prior Publication Data

US 2014/0226068 A1 Aug. 14, 2014

Related U.S. Application Data

(63) Continuation of application No. 11/583,483, filed on Oct. 18, 2006, now Pat. No. 8,700,791.

(Continued)

(51) Int. Cl.
*G06F 15/16* (2006.01)
*H04N 5/04* (2006.01)
*G06F 3/01* (2006.01)

(52) U.S. Cl.
CPC .............. *H04N 5/04* (2013.01); *G06F 3/016* (2013.01); *G06F 15/16* (2013.01)

(58) Field of Classification Search
CPC ....................................................... G06F 3/016
(Continued)

(56) References Cited

U.S. PATENT DOCUMENTS

| 4,334,280 A | 6/1982 | McDonald |
| 4,355,348 A | 10/1982 | Williams |

(Continued)

FOREIGN PATENT DOCUMENTS

| JP | 2003-086384 | 3/2003 |
| JP | 2003-324402 | 11/2003 |

(Continued)

OTHER PUBLICATIONS

Search Report as issued for European Patent Application No. 06826378.9, dated Aug. 30, 2012.

(Continued)

*Primary Examiner* — Nam Tran
(74) *Attorney, Agent, or Firm* — Miles & Stockbridge P.C.

(57) ABSTRACT

A method for synchronizing haptic effects with at least one media component in a media transport stream includes identifying a series of video frames containing imaging information and/or a series of audio frames containing sound information in the media transport stream; identifying a series of haptic frames containing force feedback information in the media transport stream; and synchronizing the force feedback information in response to the imaging information and/or sound information.

20 Claims, 8 Drawing Sheets

Related U.S. Application Data

(60) Provisional application No. 60/728,551, filed on Oct. 19, 2005.

(58) Field of Classification Search
USPC ............ 709/231; 348/460; 455/3.06; 463/30
See application file for complete search history.

(56) References Cited

U.S. PATENT DOCUMENTS

| | | | |
|---|---|---|---|
| 5,388,992 | A | 2/1995 | Franklin et al. |
| 5,461,711 | A | 10/1995 | Wang et al. |
| 5,526,480 | A | 6/1996 | Gibson |
| 5,586,257 | A | 12/1996 | Perlman |
| 5,669,818 | A | 9/1997 | Thorner et al. |
| 5,684,722 | A | 11/1997 | Thorner et al. |
| 5,816,823 | A | 10/1998 | Naimark et al. |
| 5,842,162 | A | 11/1998 | Fineberg |
| 5,844,392 | A | 12/1998 | Peurach et al. |
| 5,884,029 | A | 3/1999 | Brush, II et al. |
| 5,956,484 | A | 9/1999 | Rosenberg et al. |
| 6,036,495 | A | 3/2000 | Marcus et al. |
| 6,111,562 | A | 8/2000 | Downs et al. |
| 6,147,674 | A | 11/2000 | Rosenberg et al. |
| 6,160,489 | A | 12/2000 | Perry et al. |
| 6,161,126 | A | 12/2000 | Wies et al. |
| 6,252,583 | B1 | 6/2001 | Braun et al. |
| 6,285,351 | B1 | 9/2001 | Chang et al. |
| 6,292,776 | B1 | 9/2001 | Chengalvarayan |
| 6,359,550 | B1 | 3/2002 | Brisebois et al. |
| 6,424,356 | B2 | 7/2002 | Chang et al. |
| 6,703,550 | B2 | 3/2004 | Chu |
| 6,859,819 | B1 | 2/2005 | Rosenberg et al. |
| 6,885,876 | B2 | 4/2005 | Aaltonen et al. |
| 6,963,762 | B2 | 11/2005 | Kaaresoja et al. |
| 7,680,451 | B2 * | 3/2010 | Roy et al. .................... 455/3.06 |
| 2001/0036868 | A1 * | 11/2001 | Roy et al. ....................... 463/30 |
| 2002/0123812 | A1 | 9/2002 | Jayaram et al. |
| 2003/0002854 | A1 | 1/2003 | Belknap et al. |
| 2003/0006892 | A1 | 1/2003 | Church |
| 2003/0067440 | A1 | 4/2003 | Rank |
| 2003/0076298 | A1 | 4/2003 | Rosenberg |
| 2004/0089141 | A1 | 5/2004 | Georges et al. |
| 2005/0145100 | A1 | 7/2005 | Ramstein |
| 2006/0227364 | A1 | 10/2006 | Frank et al. |

FOREIGN PATENT DOCUMENTS

| | | |
|---|---|---|
| JP | 2004-081357 | 3/2004 |
| JP | 2004-229039 | 8/2004 |
| JP | 2005-229168 | 8/2005 |
| JP | 2005-523612 | 8/2005 |
| WO | WO 02/053246 | 7/2002 |
| WO | WO 03/089100 | 10/2003 |
| WO | WO 2005/048541 | 5/2005 |

OTHER PUBLICATIONS

Notice of Reasons for Rejection as issued for Japanese Patent Application No. 2011-091656, dated Mar. 19, 2013.

Gillespie, B., "The Virtual Piano Action: Design and Implementation," Center for Computer Research in Music and Acoustics, 1994, 4 pages.

"VibeTonz System", Immersion Corporation, 2004, pp. 1-6.

"VibeTonz Mobile Player", Immersion Corporation, 2005, 4 pages.

"VibeTonz Solution for Brew Developers", Immersion Corporation, 2005, 2 pages.

"VibeTonz Studio SDK", Immersion Corporation, 2005, 4 pages.

Kirman, J. H., "Tactile Perception of Computer-Derived Formant Patterns From Voiced Speech," J. Acoust. Soc. Am., vol. 55, No. 1, Jan. 1974, pp. 163-169.

Reed, C. M., et al., "Research on Tactile Communication of Speech: A Review," ASHA Monographs, No. 20, 1982, pp. 1-23.

* cited by examiner

SYNCHRONIZATION OF HAPTIC EFFECT DATA IN A MEDIA TRANSPORT STREAM

CROSS-REFERENCE TO RELATED APPLICATIONS

This application is a continuation application of U.S. patent application Ser. No. 11/583,483, filed Oct. 18, 2006, which claims the benefit of priority from U.S. Provisional Patent Application Ser. No. 60/728,551, filed Oct. 19, 2005, the contents of both of which are hereby incorporated herein by reference in their entireties.

FIELD

The present invention relates to the field of haptics. More particularly, the present invention relates to haptic effects encoded in media transport streams.

BACKGROUND

To improve the interface between a user and a machine, incorporating haptic effects into the interface along with audio/video media has become more and more prevalent in recent years. Haptic effects such as vibrations can be felt by a user and may typically be related to an event trigger, such as the depressing of a key on a device or the playing of ring tones to announce an incoming call or the receipt of a text message on a cellphone, and the like. Generally, media playback can be complemented with vibrations. However, conventional methods of implementing haptic effects have some problems when playing a haptic signal along with a media signal over a period of time.

One such problem is the need to synchronize playback between haptic signals and other media signals such as video and/or audio signals. Typically, the audio engine, video engine and the haptic engine operate on different clocks. There is usually no built-in synchronization mechanism during playback of haptic, video, and audio signals. Although, for example, at the beginning of a playback, the haptic signal and the media signal may start within a few milliseconds of one another and as such are adequately synchronized, these signals can usually drift out of sync in a fairly short period of time.

Another such problem is that it can be difficult to randomly access a point in a media transport stream having both media and haptic signals. In other words, it is difficult to synchronize the haptic signals with media signals when a user begins the playback of a portion of the media transport stream at a random point without access to any data that may occur before this point in the media transport stream.

As such, what is needed is a solution that provides a mechanism to synchronize haptic effects with other media (e.g., audio and video), which can operate at or from any point in a media transport stream containing both haptic and media information.

SUMMARY

A method and apparatus for synchronizing haptic effects with other media components (i.e., video and/or audio) in a media transport stream is disclosed. The method includes identifying a series of video frames containing imaging information and/or a series of audio frames containing sound information in the media transport stream; identifying a series of haptic frames containing force feedback information in the media transport stream; and synchronizing the force feedback information in response to the imaging information and/or sound information.

Additional features and benefits of the present invention will become apparent from the detailed description, figures and claims set forth below.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
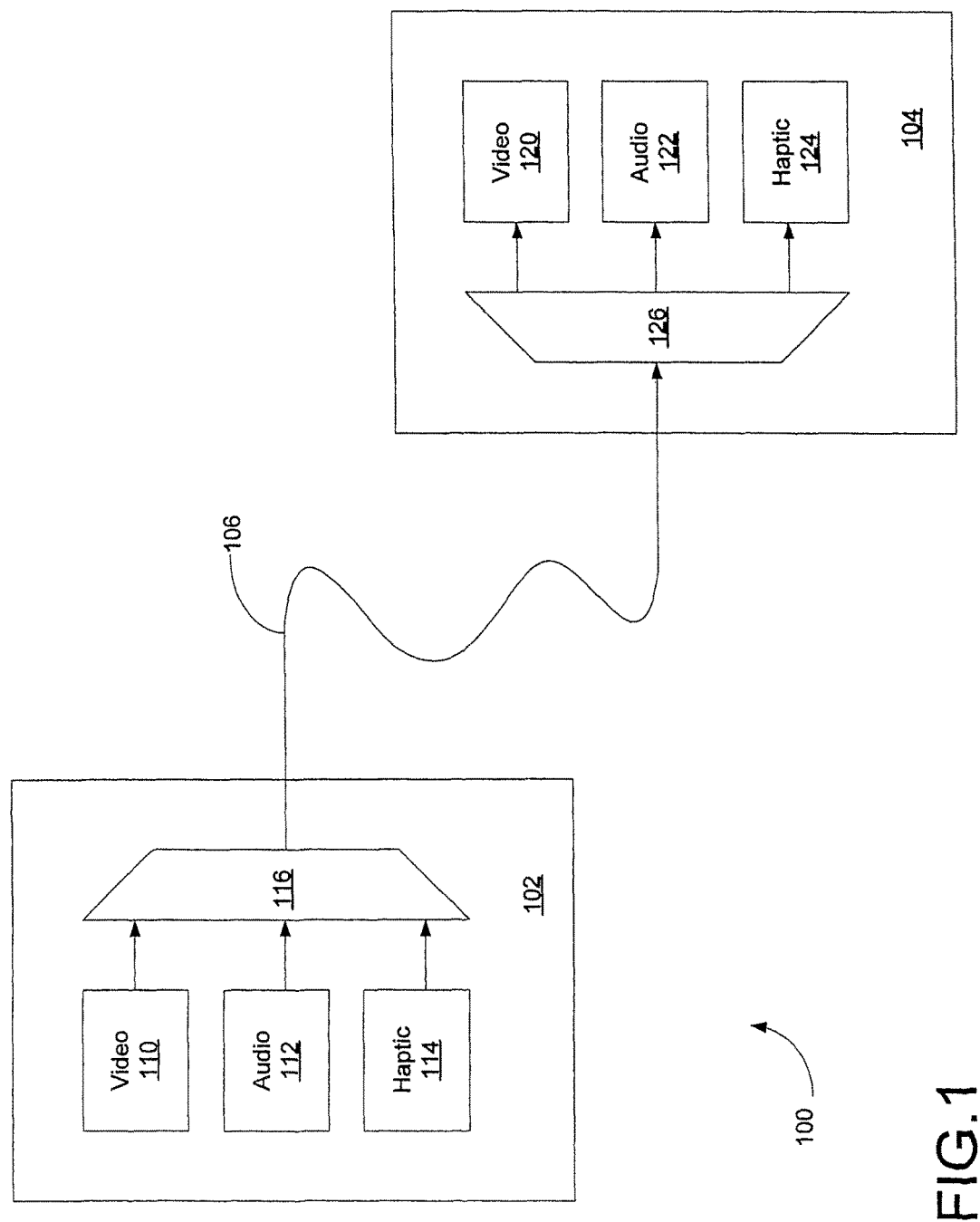
FIG. 1 is a block diagram illustrating a system for encoding, transmitting and decoding a media transport stream including haptic information in accordance with one embodiment of the present invention.

Embodiments of the present invention are described herein in the context of a method, system and apparatus for communicating a media transport stream including haptic information. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The present invention is generally directed to a mechanism for synchronizing haptic effect tracks with other media tracks contained in a multi-track media transport stream to generate synchronized multimedia effects. Haptic information in a series of frames in a media transport stream is identified and time stamps corresponding thereto are determined in accordance with a master time code signal embedded in the media transport stream. Each media transport stream frame containing haptic information is subsequently assigned a time stamp so that it will be used to activate an actuator at a proper time responsive to the time stamp to generate a haptic effect in accordance with the haptic information.

FIG. 1 is a block diagram illustrating a system 100 for encoding, transmitting and decoding a media transport stream in accordance with one embodiment of the present invention. System 100 includes a transmitter 102, a receiver 104, and a communications medium 106. Transmitter 102, in one example, is a telephone, personal digital assistant ("PDA"), personal computer ("PC") or any other digital processing device that is capable of transmitting media frames over a network. In one embodiment, transmitter 102 is a media server transmitting data over a cellular telephone wireless network. The media frames include, but are not limited to, video, audio, and/or haptic frames. Transmitter 102, in one embodiment, includes an encoder 116, a video block 110, an audio block 112, and a haptic block 114. Video block 110 sources a series of video frames and audio block 112 sources a series of audio frames. Haptic block 114 sources a series of haptic frames.

Encoder 116, for one example, is capable of encoding or generating video frames from video block 110, audio frames from audio block 112, and haptic frames from haptic block 114 and integrating them into a media transport stream in accordance with, for example, a commercially available media transport protocol such as Moving Picture Experts Group Compression Standard Version 4 ("MPEG-4"), and the like. In other words, video frames, audio frames and haptic frames are encoded or packaged into a media transport stream, and that media transport stream is subsequently transmitted to a user-designated destination over a communications medium 106. It should be noted that integrating timed haptic information into various frames can apply to any media transport stream format and is not limited to a particular file type, protocol or media player hardware environment.

Communications medium 106 can be a line (or wire) communications medium, a wireless communications medium, or a hybrid wire and wireless communications medium. The video frames from video block 110 and audio frames from audio block 112 form, respectively, a video component and an audio component, or collectively a media component of the media transport stream. The haptic frames form a haptic component of the media transport stream. Receiver 104, which could be a media player such as a phone or PC, is capable of receiving a media transport stream over a communications medium 106. In one embodiment, the media transport stream is stored in a memory such as a conventional digital video recorder, a network messaging center, or the like prior to being received by receiver 104. In another embodiment, the haptic signal transported by the media transport stream is compressed or encrypted to enhance the data security.

Receiver 104 includes a decoder 126, a video block 120, an audio block 122, and a haptic block 124. Video block 120, audio block 122, and haptic block 124, in one embodiment, are used to store video frames, audio frames, and haptic frames, respectively. Receiver 104 may be a cellular phone, a SmartPhone, a PDA, a PC, a transmitter/receiver device, or the like which is capable of receiving media transport streams over communications medium 106. Upon receipt of the media transport stream, receiver 104 parses video frames, audio frames, and haptic frames from the media transport stream and sends video frames to video block 120, audio frames to audio block 122, and haptic frames to haptic block 124. It should be noted that video frames in video block 110, audio frames in audio block 112, and haptic frames in haptic block 114 contain substantially similar information to video frames in video block 120, audio frames in audio block 122, and haptic frames in haptic block 124, respectively. It should be further noted that video frames in video block 110, audio frames in audio block 112, and haptic frames in haptic block 114 may have, where appropriate, different data formats from corresponding video frames in video block 120, audio frames in audio block 122, and haptic frames in haptic block 124 although they may contain similar information.

It should also be noted that transmitter 102 and receiver 104 may be similar devices that both contain similar capabilities for transmitting and receiving.

Figure 2:
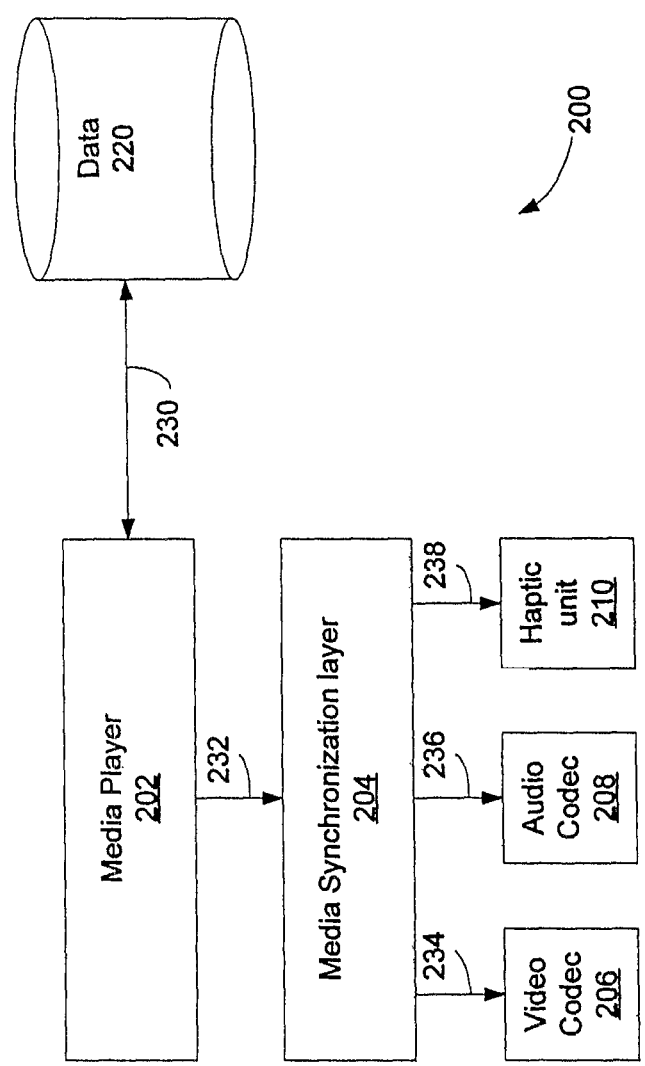
FIG. 2 is a block diagram illustrating a system for identifying media and haptic component from a media transport stream in accordance with one embodiment of the present invention.

FIG. 2 is a block diagram illustrating a system 200 for identifying media components and haptic components of a media transport stream in accordance with one embodiment of the present invention. System 200 includes a media player 202, a media sync layer 204, and a data 220. Bus 230 is used to transport data between media player 202 and database 220, and bus 232 is used to pass information between media player 202 and media sync layer 204. Media sync layer 204 is further coupled to a video codec 206, an audio codec 208, and a haptic unit 210 via buses 234-238. Video codec 206 and audio codec 208 can be software modules, hardware devices, or a combination of hardware and software components for compressing and decompressing digital information. In one embodiment, media sync layer 204 separates or extracts the video, audio and haptic components and places the extracted components in their corresponding codecs. Media sync layer 204 can be programmed or selected to handle a specific media transport stream format or multiple predefined streams, such as MP3, MPEG4, and the like.

During operation, media sync layer 204 synchronizes the disparate media by delivering frames of each media type to the appropriate codec or player at a time specified by the master time code or a timing table. A set of frames representing the entire timeline is transmitted to media player 202 via the media transport stream. Upon receipt of the media transport stream, media player 202 evaluates and separates audio, video and haptic data or frames from the media transport stream. Media sync layer 204 subsequently assigns time stamps or initial time to each haptic frame according to a master time code whereby the time stamps can be used to send haptic effect timing and definitions to Haptic Unit 210, which can activate an actuator (or multiple actuators) at the proper time.

Figure 3:
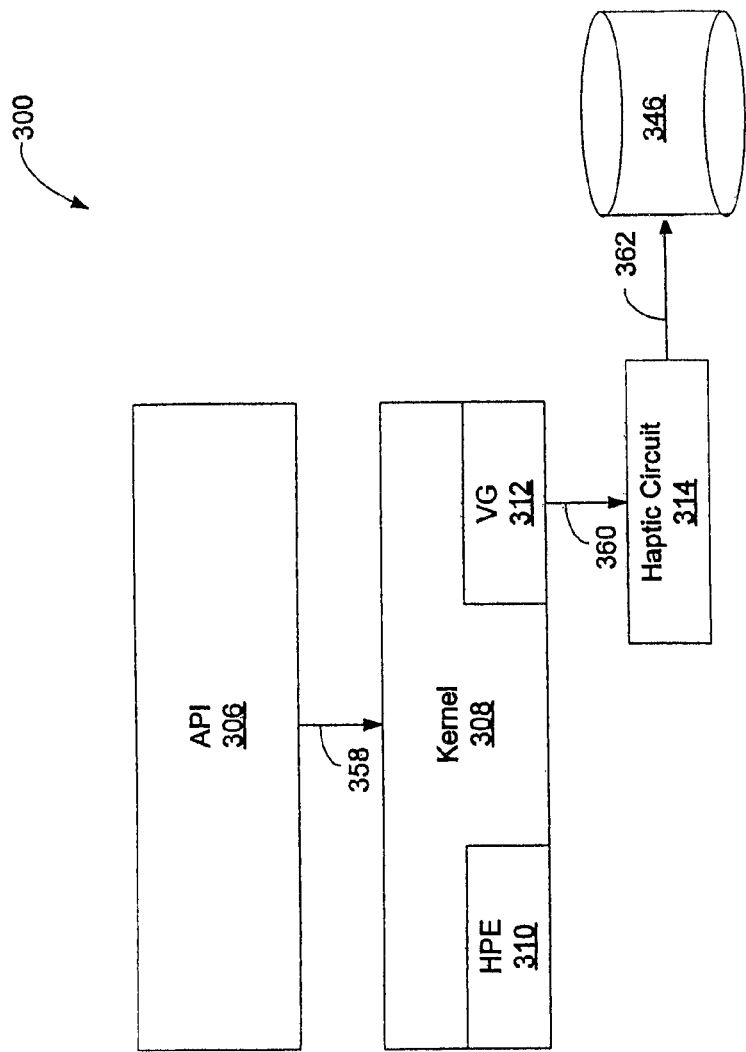
FIG. 3 is a block diagram illustrating a device for synchronizing haptic component with the other media components in accordance with one embodiment of the present invention.

FIG. 3 is a block diagram illustrating a device 300 for synchronizing haptic component with media components in accordance with one embodiment of the present invention. Device 300 includes an Application Programming Interface ("API") 306, a Kernel 308, and a haptic circuit 314. Kernel 308 further includes a vibe generator ("VG") 312 and a haptic playback engine ("HPE") 310. In one embodiment, VG 312 is used to synthesize a haptic event according to the haptic information received from API 306 while HPE 310 is used to schedule a haptic event in accordance with data received from Haptic Unit 210 via API 306 via bus 358. Kernel 308 is further coupled to haptic circuit 314 via connection 360. Haptic circuit 314, in one example, is an amplifier configured to drive actuator 346 via connection 362.

A function of API 306 is to initiate haptic effects at the correct time since each haptic frame is a self-contained haptic effect, which does not rely on other frames. An advantage of having a self-contained haptic frame is that it permits a user to randomly access a haptic frame or a media frame when using Media Player 202 and ensure that the system will still be able to generate a synchronized multimedia output including image, sound, and haptic effects.

Figure 4:
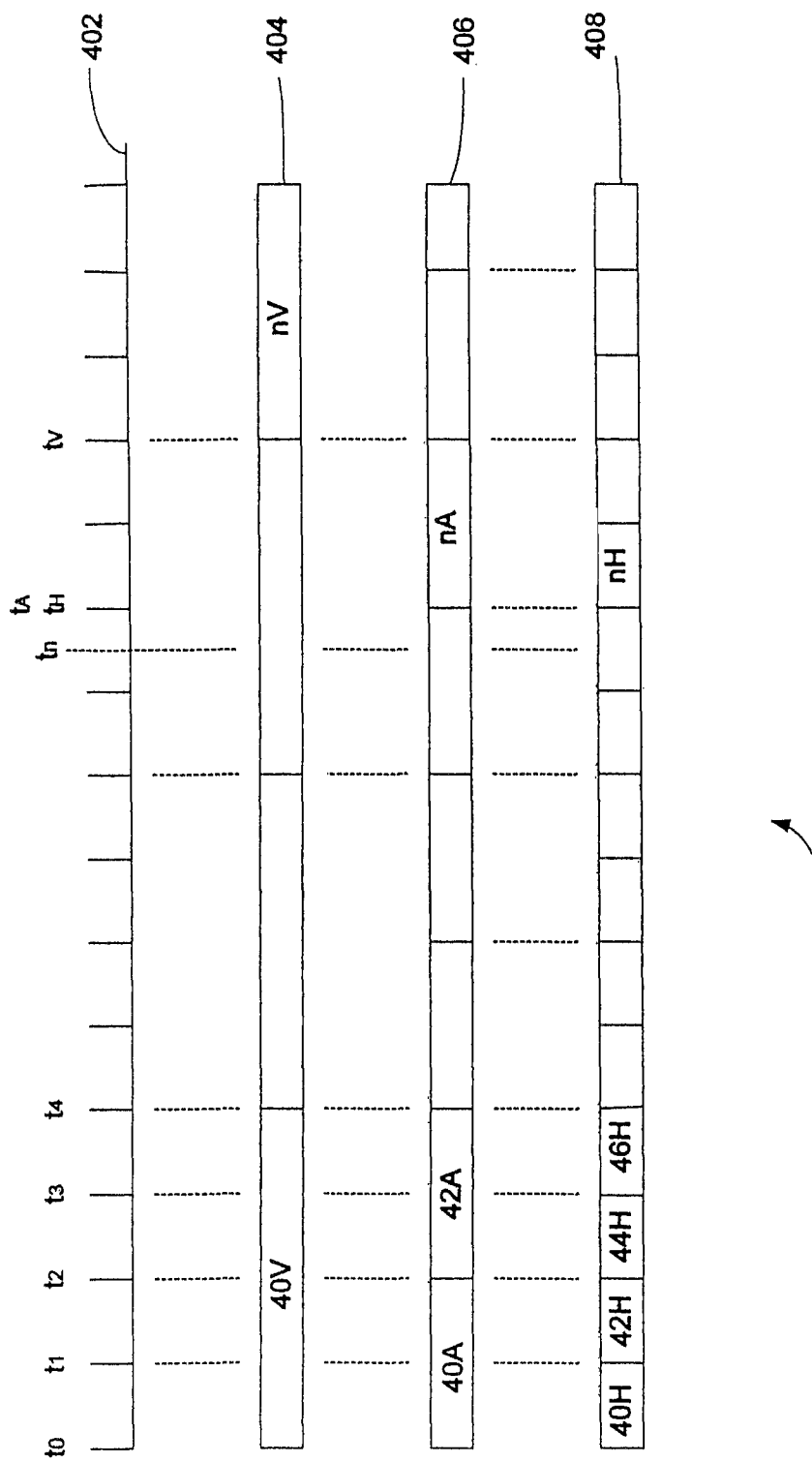
FIG. 4 is a timing diagram illustrating a method of synchronizing the playback of video, audio and haptic signals in accordance with one embodiment of the present invention.

FIG. 4 is a timing diagram 400 illustrating a method of synchronizing the playback of video, audio and haptic signals in accordance with one embodiment of the present invention. Timing diagram 400 illustrates a master time code 402 embedded in the media transport stream, a video component 404 of the media transport stream, an audio component 406 of the media transport stream, and a haptic component 408 of the media transport stream. Master time code 402 is embedded in and can be extracted from the media transport stream. For example, audio component 406 is used as master time code 402. In one embodiment, master time code 402 is a timeline with a series of time stamps such as $t_0$, $t_1$, $t_2$, and so on.

Video component 404 includes a stream of a plurality of sequential video frames such as frame 40V. Audio component 406 includes a stream of a plurality of sequential audio frames such as frames 40A and 42A. Haptic component 408 also includes a stream of a plurality of sequential haptic frames such as frames 40H, 42H, and so on. While the frame formats may be different between the video, audio and haptic frames, the frames within the component will be configured in accordance with a common protocol. For example, haptic frame 40H is substantially the same size as haptic frame 42H. In another embodiment, the time span covered by 40H and 42H are, for example, 200 ms each, but their physical memory footprints are usually different. It should be noted that the haptic frame sizes, in one embodiment, are determined by the length of time as oppose to physical capacity.

Referring back to FIG. 4, at time stamp to, haptic frame 40H, audio frame 40A and video frame 40V begin playback at substantially the same time. Although haptic frame 40H finishes playing at time stamp $t_1$, haptic effects defined in frame 40H might still be playing beyond time $t_1$. At time stamp $t_1$, haptic frame 42H starts to be processed for playing. It should be noted that the initial time or time stamp at which haptic frame 42H is played corresponds to a time determined from the master time code. Assigning a time stamp to a haptic frame allows the haptic frame such as frame 42H to begin playback independent from the time at which the preceding haptic frame, such as frame 40H, is finished playing. Thus, if haptic frame 40H has finished playing prior to time stamp $t_1$, no haptic effects will be played until haptic frame 42H is played at time stamp $t_1$. At time stamp $t_{-2}$, haptic frame 44H and audio frame 42A will be played. At time stamp $t_3$, haptic frame 46H, video frame 40V, and audio frame 42A will be played.

Encoding time stamps within the haptic frames enable a user to randomly access a haptic frame, which is still able to synchronize its haptic effect(s) with other media components.

For example, if a user were to fast forward to time for example, the player would wait until time $t_H$ before playing the next haptic frame nH. Prior to that, no haptic effects would be instance played. Similarly, the player would wait until $t_A$, which in this instance is equivalent to $t_H$, before playing the next audio frame nA. Similarly, the player would wait until $t_v$ to play the next video frame nV. In addition to this, one embodiment allows the media sync layer 204 to specify playback to begin at exactly time t n, in which case media sync layer 204 transmits Haptic frame (n−1)H and specifies a time offset of tn−(t−1)H to Haptic Unit 210. Haptic Unit 210 then communicates this time offset to API 306 when attempting to playback theistic frame (n−1)H.

Each haptic frame is allowed to contain multiple haptic effects. The parameters that define and schedule these haptic effects are capable of offsetting haptic effects to be played back within a frame. In other words, the time offset between the haptic effects is relative to the start of the frame, not the start of the file or media transport stream. Scheduling individual effects within a frame is the responsibility of the device playing the sounds, images, and haptic effects. Since the sync layer of the device schedules playback of video, audio, and haptic frames, any drift between the different media can be corrected at the start of each frame.

Figure 5:
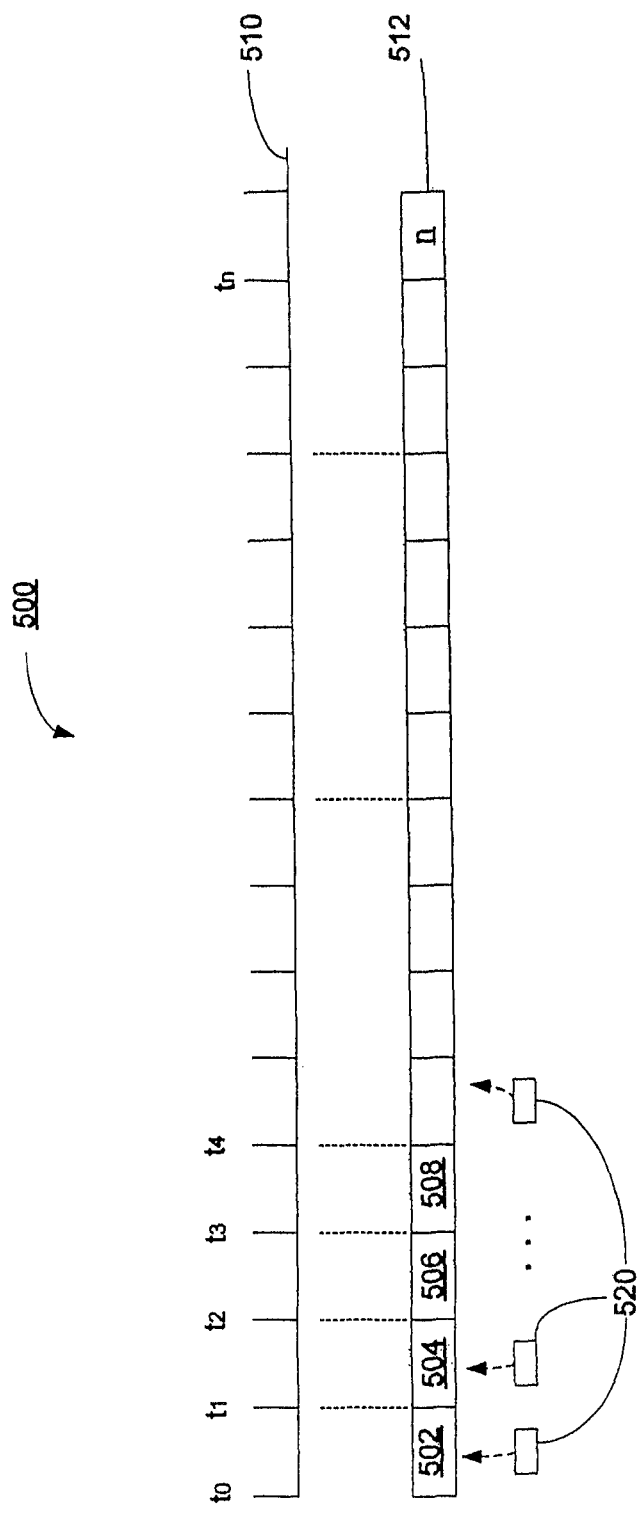
FIG. 5 is a diagram illustrating a haptic signal parsed into successive frames in accordance with one embodiment of the present invention.

FIG. 5 is a diagram 500 illustrating a haptic signal parsed into successive frames in accordance with one embodiment of the present invention. Diagram 500 includes a master time code 510 and a haptic component 512. Haptic component 512 further includes multiple haptic frames such as frame 502 and 504. Each haptic frame represents and occupies a fixed length of time and packages multiple haptic effects associated with that fixed length of time. The timeline and time stamps such as $t_0$ and $t_1$ are determined by a master time code 512, which is embedded in a media transport stream. The media transport stream may include the haptic information as well as other media information such as audio and video information.

The master time code 510 is used by a media player to coordinate the reception and playback of all frames or data packets it receives for a file. The frame length in time can be selected and fixed during normal operation. In one embodiment, a range of frame length between 100 to 300 ms (milliseconds) is used depending on the nature of the data and user's preferences. In some special operations, a 1 ms frame length may be used to meet some extremely tight synchronization requirements. It should be noted that the cost associated with an 1 ms frame length can be high because it requires a significantly increased bandwidth usage. Generally, a longer frame length means less frames need to be synchronized with media effects, which implies a greater chance to cause the haptic effects to be out of synchronization with the media effects. The media effects indicate effects other than haptic effects, such as video and/or audio effects. On the other hand, although a shorter frame length provides a better and tighter synchronization with the other media effects, it requires more processing power and higher network bandwidth to handle the increased sync process between the haptic and media effects. The media transport stream referred to herein may be any appropriate media transport stream such as MP3 (MP3) or MPEG4 (MP4), or the like.

Each haptic frame is assigned with an initial time or a time stamp 520 at which associated haptic effect(s) should be played at a proper time according to a master time code 510. Master time code 510 may be embedded in the media transport stream as discussed earlier. In one embodiment, time stamps 520 associated with the haptic information are generated in response to a user's input. In another embodiment, time stamps 520 associated with the haptic information are generated in accordance with predefined algorithms based on the other media components. In yet another embodiment, time stamps 520 associated with the haptic information can be generated according to a combination inputs from a user and predefined algorithms in view of other media components. In one embodiment, time stamps 520 are not assigned to frames that do not contain the haptic information. For example, the data (base) omits a frame if it does not contain haptic information.

The size of a haptic frame or a haptic sample, in one embodiment, can be 8, 16, 25, 32, 64, or 128 bytes depending on the complexity of the haptic effect. For example, some haptic frames include vibration-sound and/or vibration-video data correlated to specific sounds and/or video frames, respectively. In one embodiment, a haptic frame contains information required to render at least one haptic effect and a time stamp indicating the starting time of the haptic effect. It should be noted that a haptic frame may be omitted if haptic information is not present in a frame.

Figure 6:
FIG. 6 is a block diagram illustrating a haptic frame containing haptic information in accordance with one embodiment of the present invention.

FIG. 6 is a block diagram illustrating a haptic frame 600 containing haptic information in accordance with one embodiment of the present invention. In one embodiment, haptic information is used to define each haptic effect to be played within a frame. Haptic information includes various parameters, such as intensity/magnitude, duration, periodicity, start-delay, attack intensity, attack timing, fade intensity, fade timing, and the like, which are necessary to implement a haptic effect or a series of haptic effects during the duration of a frame length. The duration parameter specifies how long the haptic effect plays. The start-delay parameter of a haptic effect indicates how long the haptic effect will wait to be played from the start of a frame or time stamp. In one example, haptic effects can be periodic and the periodicity parameters define such periodicity. In another embodiment, the haptic effect information uses a non-parametric encoding. Such an encoding, in one embodiment, can consist of a series of 8-bit actuator control values to be applied to a pulse width modulator that controls the instantaneous voltage applied across the actuator leads for a duration of 5 ms per 8-bit value. If every haptic frame represents 200 ms of haptic playback time, then every haptic frame would contain exactly 40 bytes of data. Haptic information may also include envelope information, which is used to control haptic effects by setting boundaries for some haptic effects.

Haptic frame 600 is an exemplary layout of a frame in which it contains a haptic effect definitions 610 and a series of call haptic effect instructions 612-616. In one embodiment, haptic effect definition 610 includes controlling information such as the duration parameter and the start-delay parameters. Each call haptic effect instruction may contain information about magnitude, attack intensity, fade intensity, and specific type of haptic effect. It should be noted that a haptic frame is capable of initiating multiple haptic effects. It should be further noted that a haptic effect may continue playing beyond the frame length or time span of the frame. In one embodiment, Call haptic effect instructions specify the haptic effect definition to be played (contained within 610) as well as a frame time offset parameter that controls how far into the frame playback commences.

Figure 7:
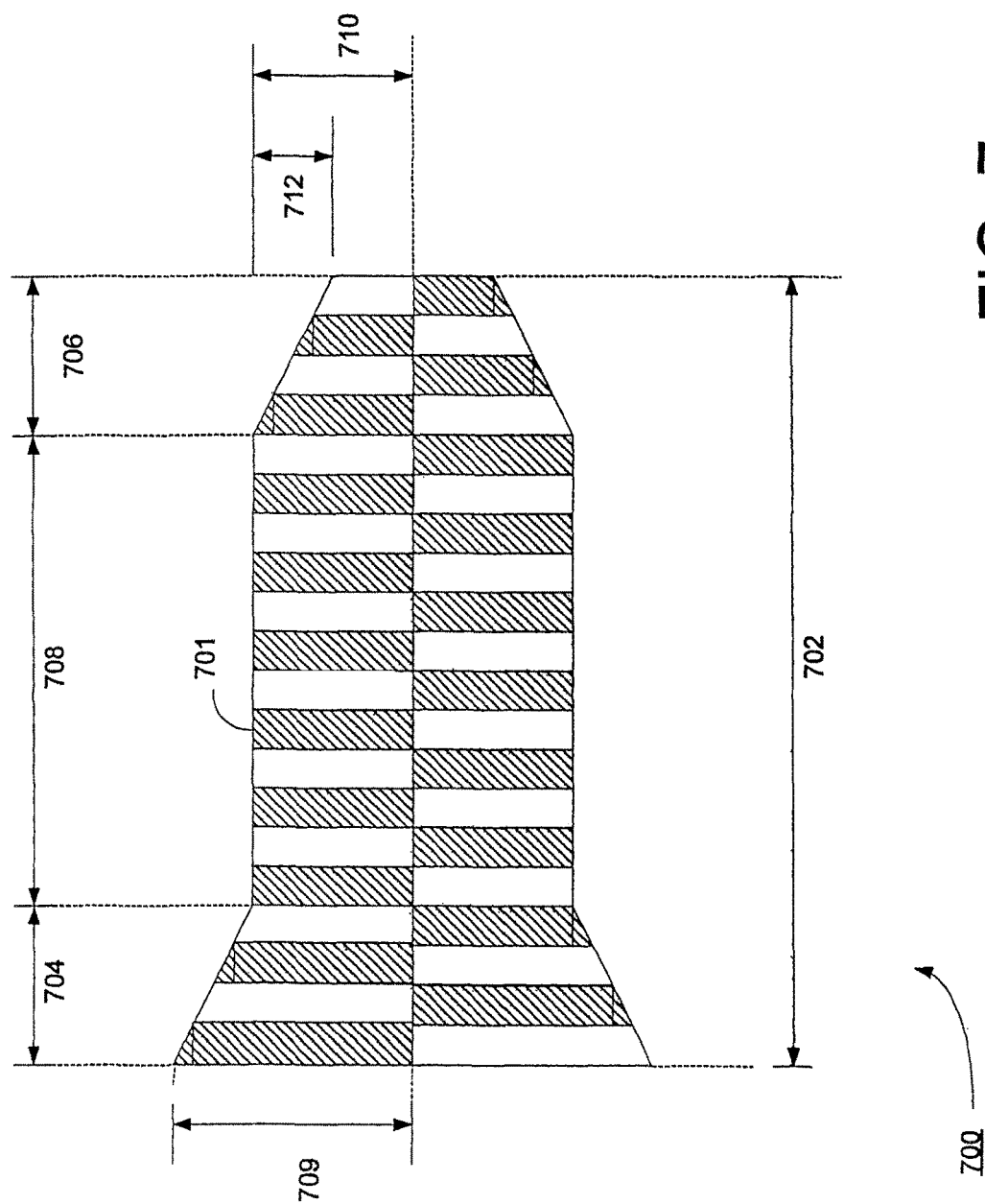
FIG. 7 is a diagram illustrating a waveform causing haptic effects in accordance with one embodiment of the present invention.

FIG. 7 is a haptic diagram 700 illustrating a waveform 701 causing haptic effects in accordance with one embodiment of the present invention. Waveform 701 causes haptic sensation to a user using several different frequencies. The haptic effects of waveform 701 last for the duration 702 during which there is an attack time 704, a normal time 708 and a fade time 706. The intensity of the haptic effect at its start is specified by an "attack level" 709. The intensity of the haptic effect changes to a "magnitude" level 710 by the start of the normal time 708 and it changes to the fade level 712 at the end of the fade time 706. Alternatively, fade level 712 can also be measured from zero haptic effect.

A frequency period or periodic type can be constant force, square wave, triangle wave, sine wave, saw tooth wave, inverted saw tooth wave, or any combination of the above-stated waveforms. It should be noted that a different frequency period provides different haptic feedback. For example, waveform 701 could be in a range from 0.1 Hertz to 1000 Hertz wherein different frequencies provide different haptic sensations.

In operation, the haptic effect caused by waveform 701 is defined in terms of its attack level 709, attack time 704, fade level 712 and fade time 706. When it is time to execute waveform 701, the execution process specifies the base intensity or "magnitude" of the haptic effect, its duration, whether it is to be played periodically, and if so, how often it is to be re-started. The information defining a particular haptic effect is, in one embodiment, downloaded periodically to a playing device with every frame. It should be noted that waveform 701 is only an example and those of ordinary skill in the art will now readily understand that such haptic effects may be defined in any number of ways.

The present invention includes various processing steps, which will be described below. The steps described herein may be embodied in machine or computer executable instructions. These instructions, in turn, may be used to cause a general purpose or special purpose system, which is programmed with these instructions to perform the steps described herein. Alternatively, the steps described herein may be performed by specific hardware components that contain hard-wired logic for performing the steps, or by any combination of programmed computer components and custom hardware components. While embodiments of the present invention will be described with reference to a wireless communications network, the method and apparatus described herein is equally applicable to other network infrastructures or other data communications environments including wired.

Figure 8:
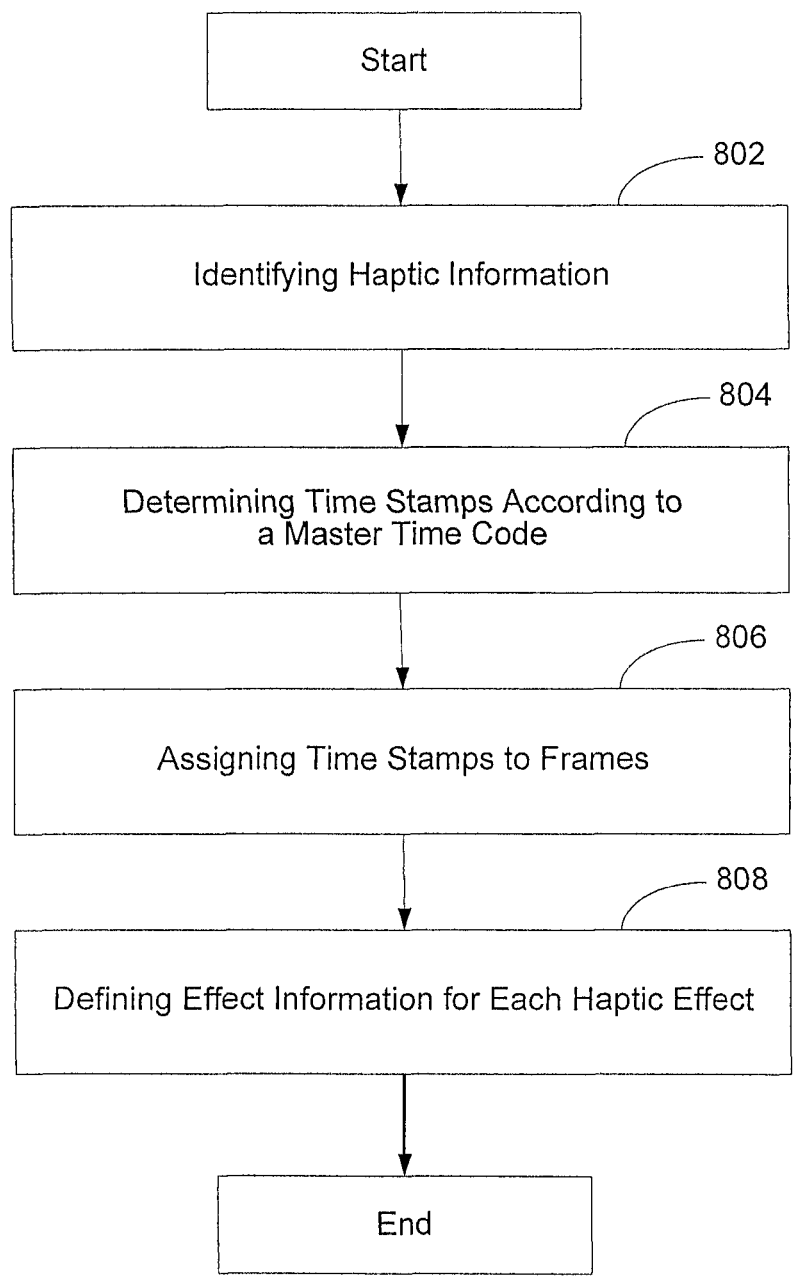
FIG. 8 is a flow chart illustrating a process for synchronizing haptic effects with the media component in accordance with one embodiment of the present invention.

FIG. 8 is a flow chart illustrating a process for synchronizing haptic effects with other media components in accordance with one embodiment of the present invention. At block 802, the process identifies haptic information in at least one haptic frame in a media transport stream. In one embodiment, the process identifies a series of video, audio, and haptic frames wherein the haptic frames includes force feedback information. Video frames contain imaging information and audio frames contain sound information. The process is capable of synchronizing the force feedback information according to the imaging information and sound information. The process is further capable of generating a haptic effect including attack and fade levels. Once the haptic information is identified, the process moves to block 804.

At block 804, the process determines time stamps according to a master time code embedded in the media transport stream. In one embodiment, a time stamp is a point of time on a timeline according to the master time code and it is used to trigger execution of haptic effects defined in a haptic frame. In accordance with one embodiment of the present invention, a time stamp is assigned to a haptic frame so that the haptic frame will be executed at a time indicated by the time stamp. The process then moves to the next block.

At block 806, the process assigns various time stamps to various haptic frames wherein the time stamps indicate when to activate one or more actuators to generate haptic effects according to the haptic information stored in the haptic frames. In one embodiment, the time stamps are assigned according to the audio and video information. Also, the process is capable of assigning a sub-time stamp that is an offset of the time stamp within a single haptic frame. After block 806, the process proceeds to the next block.

At block 808, the process defines haptic effect information for each haptic effect in response to the haptic information in the haptic frames. In one embodiment, the process encodes the haptic effect information in response to the other media information such as video and/or audio signals. In another embodiment, the process encodes the haptic effect information in response to one of several predefined algorithms selected by a user. It should be noted that each haptic frame can contain multiple haptic effects starting at different times. It should be further noted that the process is capable of activating an actuator according to the haptic effect information, and also maintaining the haptic effect according to an associated time stamp.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for synchronizing haptic effects, the method comprising:
   identifying by a media player, a series of video frames containing imaging information or a series of audio frames containing sound information, in a media transport stream;
   identifying by the media player, a series of haptic frames containing force feedback information, in the media transport stream; and
   synchronizing the force feedback information with the imaging information or the sound information, wherein the synchronizing is performed by a media synchronization layer and based on a plurality of predetermined time stamps specified within a master timing table in the media transport stream, wherein, when a time stamp is assigned to a haptic frame, the haptic frame is executed at a time indicated by the time stamp.

2. The method according to claim 1, wherein the synchronizing of the force feedback information comprises utilizing time stamps within the series of video frames or the series of audio frames to determine which haptic frame of the series of haptic frames to play back with a selected video frame or a selected audio frame.

3. The method according to claim 2, further comprising assigning the time stamps to the series of haptic frames by the media synchronization layer.

4. The method according to claim 1, wherein each haptic frame in the series of haptic frames is sized with substantially the same length of time.

5. The method according to claim 1, wherein each haptic frame in the series of haptic frames contains multiple haptic effects.

6. The method according to claim 5, wherein the multiple haptic effects are offset in time from one another relative to the start of a corresponding haptic frame.

7. The method according to claim 1, wherein the force feedback information comprises at least one of intensity, magnitude, duration, periodicity, start-delay, attack intensity, attack timing, fade intensity, or fade timing of a haptic effect.

8. A non-transitory computer readable medium having instructions stored thereon that, when executed by a processor, cause the processor to perform synchronization of haptic effects, the performing comprising:
   identifying by a media player, a series of video frames containing imaging information or a series of audio frames containing sound information, in a media transport stream;
   identifying by the media player, a series of haptic frames containing force feedback information, in the media transport stream; and
   synchronizing the force feedback information with the imaging information or the sound information, wherein the synchronizing is performed by a media synchronization layer and based on a plurality of predetermined time stamps specified within a master timing table in the media transport stream, wherein, when a time stamp is assigned to a haptic frame, the haptic frame is executed at a time indicated by the time stamp.

9. The non-transitory computer readable medium according to claim 8, wherein the synchronizing of the force feedback information comprises utilizing time stamps within the series of video frames or the series of audio frames to determine which haptic frame of the series of haptic frames to play back with a selected video frame or a selected audio frame.

10. The non-transitory computer readable medium according to claim 9, wherein the synchronizing of the force feedback information further comprises assigning the time stamps to the series of haptic frames by the media synchronization layer.

11. The non-transitory computer readable medium according to claim 8, wherein each haptic frame in the series of haptic frames is sized with substantially the same length of time.

12. The non-transitory computer readable medium according to claim 8, wherein each haptic frame in the series of haptic frames contains multiple haptic effects.

13. The non-transitory computer readable medium according to claim 12, wherein the multiple haptic effects are offset in time from one another relative to the start of a corresponding haptic frame.

14. The non-transitory computer readable medium according to claim 8, wherein the force feedback information comprises at least one of intensity, magnitude, duration, periodicity, start-delay, attack intensity, attack timing, fade intensity, or fade timing of a haptic effect.

15. A system for synchronizing haptic effects, the system comprising:
a processor configured to execute a collection of software modules, wherein the processor is further configured, when executing the collection of software modules, to:
identify by a media player, a series of video frames containing imaging information or a series of audio frames containing sound information, in a media transport stream;
identify by the media player, a series of haptic frames containing force feedback information, in the media transport stream; and
synchronize the force feedback information with the imaging information or the sound information, wherein the synchronizing is performed by a media synchronization layer and based on a plurality of predetermined time stamps specified within a master timing table in the media transport stream, wherein, when a time stamp is assigned to a haptic frame, the haptic frame is executed at a time indicated by the time stamp.

16. The system according to claim 15, wherein the synchronizing of the force feedback information comprises utilizing time stamps within the series of video frames or the series of audio frames to determine which haptic frame of the series of haptic frames to play back with a selected video frame or a selected audio frame.

17. The system according to claim 16, wherein the time stamps are assigned to the series of haptic frames by the media synchronization layer.

18. The system according to claim 15, wherein each haptic frame in the series of haptic frames is sized with substantially the same length of time.

19. The system according to claim 15, wherein each haptic frame in the series of haptic frames contains multiple haptic effects.

20. The system according to claim 19, wherein the multiple haptic effects are offset in time from one another relative to the start of a corresponding haptic frame.

* * * * *